United States Patent Office 2,765,930
Patented Oct. 9, 1956

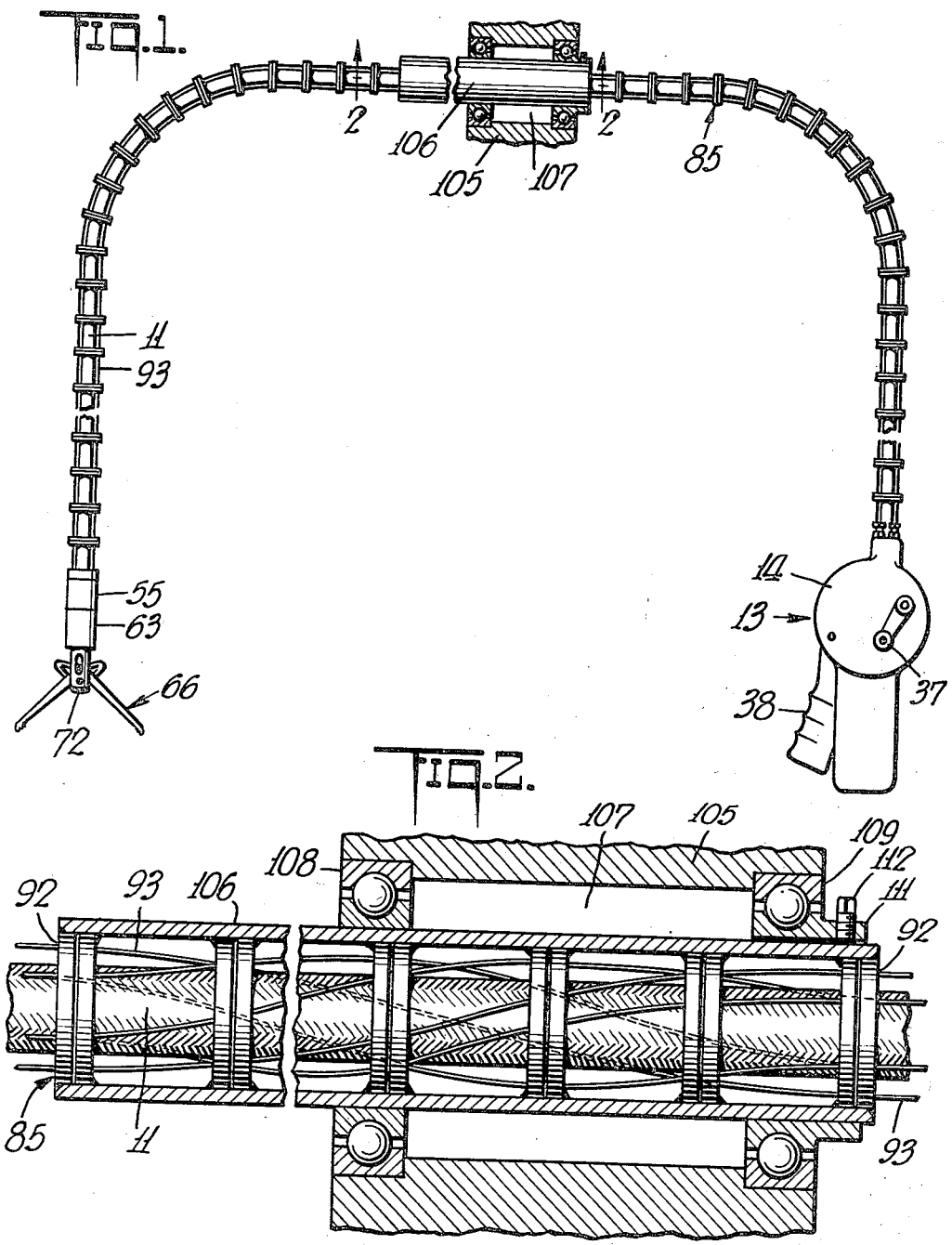

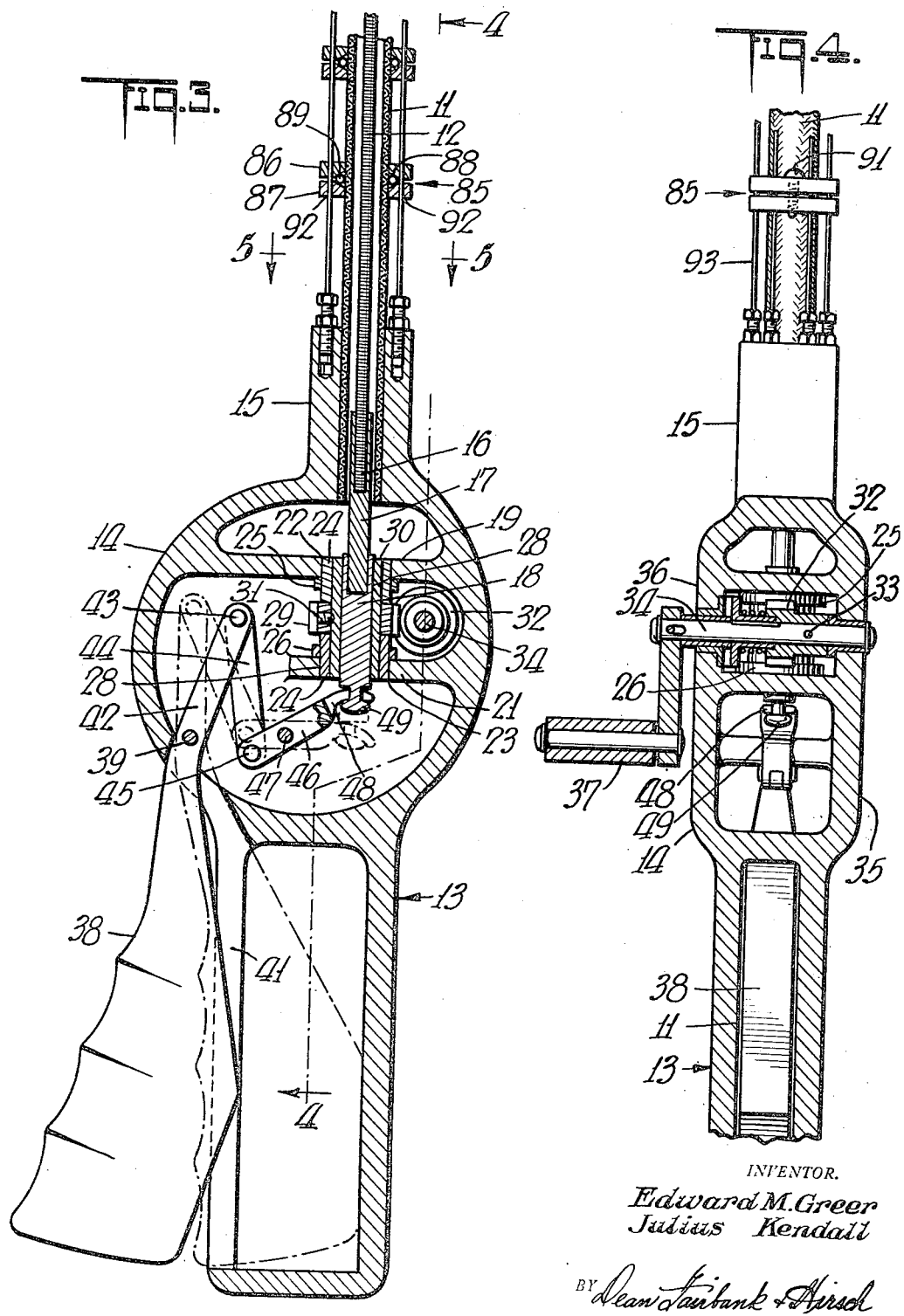

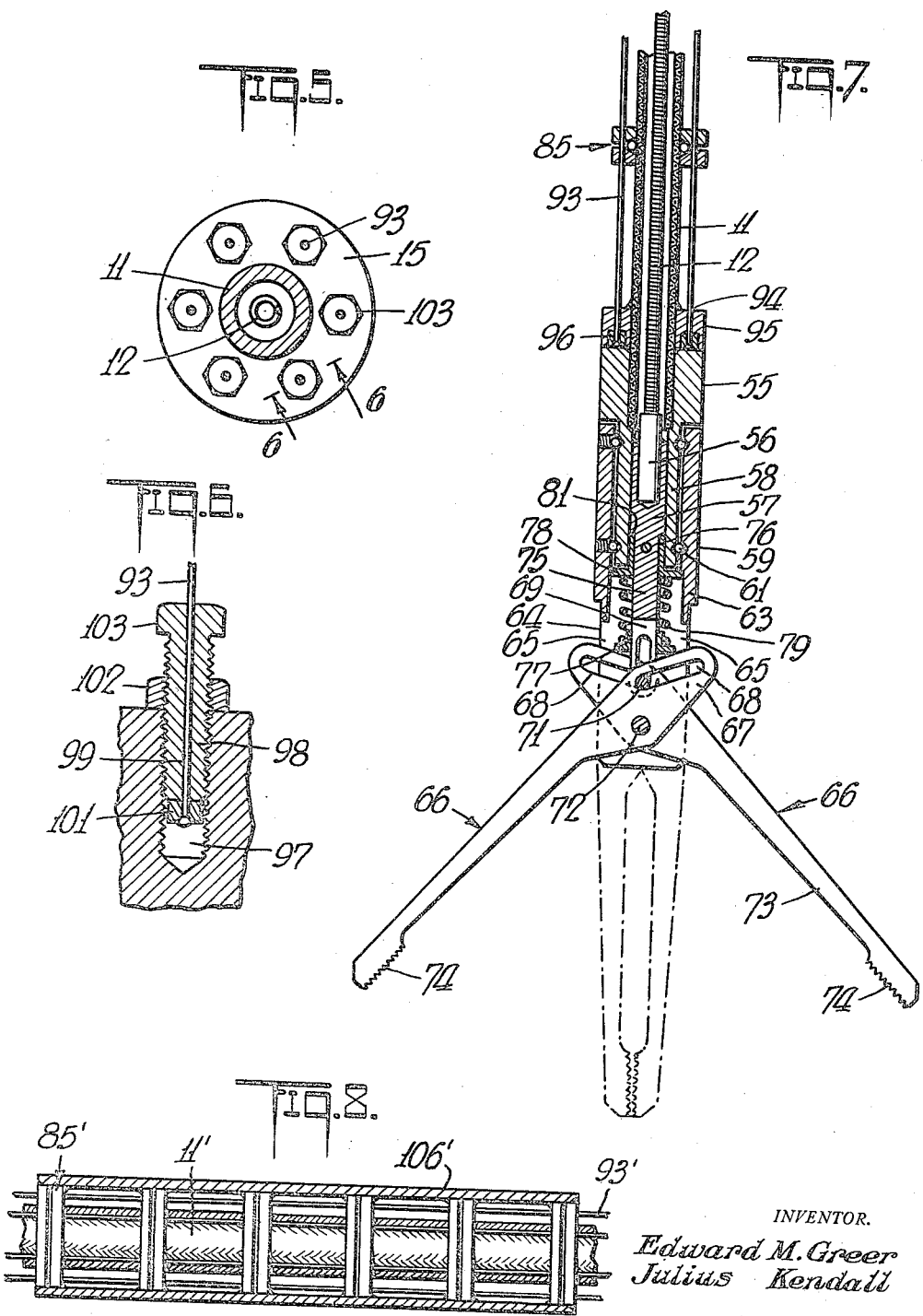

2,765,930

MATERIAL HANDLING MANIPULATOR

Edward M. Greer, Great Neck, and Julius Kendall, Garden City, N. Y., assignors to Greer Hydraulics, Inc., Brooklyn, N. Y., a corporation of New York Application September 14, 1953, Serial No. 380,061

5 Claims. (Cl. 214—1)

This invention relates to the art of material handling manipulators, more particularly to a manipulator capable of substantially instantaneous response at its output end to any one or more of a plurality of different motions applied to its input end.

In the handling of radioactive materials or materials which must be free from contamination such as sterile solutions, for example, it is essential that the operator be at a position remote from the location of the work to be performed and be separated from such work by a partition, which in the case of radioactive material must be of considerable thickness. Furthermore, in order to achieve complete flexibility of performance, it is also essential that a manipulator controlled from the remote position be capable of performing substantially all movements capable of being performed by hand.

Where a manipulator is used for this purpose which is bulky and has many moving parts, linkages and joints, which are likely to become out of order, or requires the use of a multiplicity of bulky electrical motors, the manipulator is relatively difficult to handle and requires an elaborate control system for this purpose, all of which complexity adds greatly to the cost of the manipulator, to the difficulty of handling, and to the need for frequent maintenance and repair with consequent disabling of the equipment at such time.

It is accordingly among the objects of the invention to provide a manipulator that is neat, compact, having but few inexpensive parts that may readily be fabricated at low cost and which may readily be installed with but little modification of the chamber in which it is used, which may readily be operated and which, upon application of any one or more given motions at the input end or remote control position will give a desired motion at its output end for the manipulation of a tool or the handling of an object and will permit the application of considerable pressure, at such output end, on the work to be performed, without need for electric motors, electric wires, elaborate linkages, cams or gears to achieve such motions and which is not likely to jam or become deranged even with long continued use.

According to the invention from its broader aspect, the manipulator comprises a flexible elongated member supported between its ends. Elongated tension applying means extend along said member being affixed at its respective ends to the latter whereby upon bending of the flexible member at one end to which an end of the tension applying means is affixed, in direction to apply tension to said tension applying means, tension will be applied to the other end of said flexible member at the region at which the other end of the tension applying means is affixed to cause bending of said other end of the flexible member in the direction of application of tension at said other end.

More specifically, the manipulator comprises an elongated flexible casing through which extends a flexible shaft mounted so that it may be rotated and reciprocated independently of such casing. Extending longitudinally of the shaft and the casing is at least one tension applying means such as a cable or wire affixed at each of its ends near the respective ends of such casing so that upon bending of one of the ends of such casing, through he tension imparted by such cable, the other end of the casing will also be bent.

Desirably, a plurality of such cables are provided which may be equally spaced around the casing and suitable guide means are provided for such cables, clamped to the casing along its length preferably at relatively close intervals so that upon the bending of the casing at one end, the bending motion imparted to the other end will be of substantially the same magnitude with a minimum of loss due to play in such cables.

In a specific application of the invention, a tool such as a clamp member is mounted at the output end of the flexible shaft so that it will rotate therewith and through suitable linkage from the shaft, the clamp member may be opened and closed at the same time as it is rotated, each of said motions being independent of each other and independent of the bending motion applied to the casing by the bending of such casing at the input end.

In the accompanying drawings in which are shown one or more of various possible embodiments of the several features of the invention.

Fig. 1 is a side elevational view of the manipulator mounted in a wall,

Fig. 2 is a sectional view taken along line 2—2 of Fig. 1 on a greatly enlarged scale, showing the mounting means for the manipulator, Fig. 3 is a longitudinal sectional view on a greatly enlarged scale of the input end of the manipulator, Fig. 4 is a longitudinal sectional view taken along line 4—4 of Fig. 3, Fig. 5 is a transverse sectional view taken along line 5—5 of Fig. 3, Fig. 6 is a detail sectional view taken along line 6—6 of Fig. 5, Fig. 7 is a longitudinal sectional view on a greatly enlarged scale of the output or clamping end of the manipulator, and Fig. 8 is a view similar to Fig. 2 of another embodiment of the invention.

Referring now to the drawings, the manipulator desirably comprises an elongated flexible casing 11 of conventional type which desirably is of braided or woven wire, through which extends a flexible shaft 12.

Means are desirably provided to rotate and reciprocate the flexible shaft 12. To this end, as is clearly shown in Fig. 3, a handle 13 is provided at the input end of the flexible shaft 12 which is at the remote position accessible to the operator. The handle desirably comprises, in the illustrative embodiment herein shown, a substantially hollow, central portion 14 with a cylindrical longitudinal extension 15. The casing 11 with its container shaft 12 extends into the bore of the cylindrical extension 15 and the casing 12 is securely affixed to the wall of such bore. The end 16 of the flexible shaft 12 in the cylindrical extension 15 desirably extends into the longitudinal bore of a cylindrical rod 17 and is securely affixed in said bore so as to retate therewith. The rod 17 desirably extends into and is affixed in the bore of a shaft 18 which in the illustrative embodiment herein shown, is desirably rectangular in cross section.

The central portion 14 of said handle 13 desirably has a pair of transverse walls 19 and 21, preferably formed integral therewith, said walls having aligned openings 22 and 23 therethrough which serve as bearings for the ends of longitudinally spaced elongated bushings 24. The bushings are desirably restrained from displacement through said openings by means of collars 25 and 26 which are affixed to the bushing as by set screws (not shown) and abut against the inner sides of said walls. Extending through the bores of the bushings 24 is a sleeve 30 which desirably has a rectangular bore 28 through which the shaft 18 extends so that upon rotation of said sleeve 30, the shaft 18, the rod 17 and the flexible shaft 12 connected thereto will rotate therewith.

Although the sleeve 30 may be rotated in any suitable manner, in the embodiment herein shown, a worm gear 29 is affixed thereto between the ends of bushings 24, as by a set screw 31, and meshes with a worm 32 which, as is clearly shown in Fig. 4, is affixed by a set screw 33 to a shaft 34 which extends transversely through the side walls 35 and 36 of the central portion 14 of the handle, and has a crank 37 affixed therto. Thus upon rotation of crank 37, corresponding motion will be imparted to the shaft 34 and worm 32 to rotate the worm gear 29 and the flexible shaft 12.

Means are provided to reciprocate the flexible shaft 12. To this end, in the illustrative embodiment herein shown, a grip portion 38, illustratively a lever, is pivotally mounted as at 39 in the central portion 14 of the handle 13 and extends outwardly therefrom, said handle being provided with an elongated recess 41 in which said grip portion 38 may be moved. The inner end 42 of said lever 38 extending beyond the pivot mount 39 thereof has pivotally connected thereto as at 43, a link 44, the other end of which is pivotally connected as at 45 to a lever 46 pivotally mounted as at 47 in said central portion 14. The free end of said lever 46 desirably has a yoke conformation 48 which straddles the end of shaft 18 extending beyond the inner end of sleeve 30, said end desirably having a reduced portion, circular in cross section which is straddled by said yoke end of the lever 46 and is headed as at 49 to prevent displacement of said yoke end 48. Thus, upon movement of the grip portion or lever 38 about its pivot 39 in a counterclockwise direction, as shown in Fig. 3, the link 44 will be lifted upwardly to pivot the lever 46 in a clockwise direction about its pivot 47 so that the shaft 18 will be moved downwardly, also moving the flexible shaft 12 in a corresponding direction.

As shown in Fig. 7, the output or driven end of the flexible shaft 12 desirably extends through the bore of a sleeve 55, the flexible casing 11 being affixed in said bore sleeve in any suitable manner. The flexible shaft 12 extending into the bore of said sleeve 55 is desirably affixed at its end to a rod 56 which extends into and is affixed in the bore of an elongated shaft 57.

The sleeve 55 is desirably of reduced diameter at one end forming a cylindrical extension 58. Encompassing said cylindrical extension 58 and slightly spaced therefrom is a sleeve 59, suitable bearings 61 being provided between the extension 58 and the sleeve 59 to permit free rotation of the sleeve 59 on the cylindrical extension 58, yet restraining longitudinal displacement of said sleeve 59. The end 63 of the sleeve extends beyond the end of the cylindrical extension 58 and mounts one end of a tubular clamp carrying member 64. The outer end of the tubular member 64 desirably has diametrically opposed elongated slots 65 therein, through which extends the upper ends of a pair of clamp members 66.

As is clearly shown in Fig. 7, the upper end of each clamp member comprises a plate 67 with a slot 68 therein and the outer end of shaft 57 desirably has a slot therein defining a yoke 69, the legs of which straddle the juxtaposed plates 67. By means of a pin 71 extending through opposed openings in the ends of the legs of said yoke 69 and through the juxtaposed slots 68 in the plates 67, the shaft 57 and the plates 67 are linked together. The two plates are pivotally mounted in the tubular member 64 by means of a pivot pin 72 which extends through the tubular member 64 and through openings in the plates 67. The clamp members 66 each has an elongated portion or arm 73 extending from the associated plate 67 through the slot 65 in the tubular member 64 and the end of each arm 73 desirably has a clamp face 74, preferably formed integral therewith for gripping the work to be performed.

Encompassing the end 75 of shaft 57 are a pair of sleeves 76 and 77 slidably mounted on such shaft, each of which has a lateral flange 78. A coil spring 79 also encompasses such shaft being interposed between said flanges 78 and normally urging the end of sleeve 76 against an annular shoulder 81 on shaft 57 and the sleeve 77 against the upper edges of the plates 67 so as to normally urge the clamp arms 73 to open position as is shown in full lines in Fig. 7.

Means are provided upon bending movement applied at the handle portion of the manipulator to effect a bending movement of corresponding magnitude at the clamp end of the manipulator. To this end, as is clearly shown in the drawings, a plurality of guide members 85 are mounted on the casing 11 along its entire length, preferably being closely spaced one to another. As is shown in detail in Figs. 3 and 4, each of the guide members 85 desirably comprises a pair of discs 86 and 87 having an opening through which the casing 11 extends. The inner periphery of each of the discs on the inner surface is desirably beveled as at 88 and a flexible ring 89 preferably of rubber, also encompasses the casing 11 being positioned in the annular groove defined between the discs 86, 87 by such beveled portions 88. The flexible ring 89 is desirably of such diameter that normally the opposed faces of the discs will be spaced from each other and when the screws 91 extending transversely through the discs 86, 87 are tightened to bring the discs closer together, the resilient ring will be compressed to move the inner periphery of the latter against the outer surface of the flexible casing 11 so that the guide members are securely clamped against such casing.

The discs 86 and 87 each has transverse openings 92 therethrough adjacent their periphery and equally spaced therearound, illustratively six in number in the embodiment herein shown. The openings 92 in adjacent pairs of discs are in alignment with a tension applying member such as a flexible wire or cable 93 extending through each of such aligned openings 92 to retain the cables 93 in spaced realtion around the periphery of the casing 11, restraining the cables from lateral displacement with respect thereto but permitting movement of the cables through said aligned openings 92.

As shown in Fig. 7, the ends of the cables 93 adjacent the output end of the manipulator extend through a plurality of openings 94 in a colar 95 affixed as by welding to the casing 11. Although the cables may be affixed in the openings 94 in the collar 95 in any suitable manner such as by welding, in the illustrative embodiment herein shown, each of the cables has at its free end a plug 96 affixed thereto which is seated in a corresponding cavity or enlargement at the inner end of the opening 94 so that the end of the cable is securely retained in said opening.

The other ends of the plurality of cables adjacent the input end or handle of the manipulator are desirably retained in such manner that the tension on the cables may be adjusted. To this end, as is clearly shown in Figs. 3 to 6, the cylindrical extension 15 of the handle 13 desirably has a plurality of longitudinal bores 97 therein (Fig. 6) corresponding in number to the number of cables and longitudinally aligned with the openings 92 in the guides 85 as is shown in Fig. 3 for example.

As is clearly shown in Fig. 6, each of the bores 97 is threaded and mounts a cylindrical screw 98, each of which desirably has a longitudinal bore 99 through which extends an assocaited end of a cable 93, and the inner end of each cable desirably has a plug 101 affixed thereto to prevent outward movement of the cable from the associated bore 99. The screw 98 desirably has a nut 102 threaded thereon so that when the tension on the cable is adjusted by rotating the screws 98 by means of a tool such as a wrench applied to its head 103, the nut 102 may be tightened securely to retain the cable in position of adjustment.

Although the manipulator may be mounted in a wall or partition 105 in any suitable manner, in the illustrative embodiment shown in Figs. 1 and 2, the mounting means desirably comprises a sleeve 106 through which the flexible shaft 12 and casing 11 extends, as is clearly shown in Fig. 2. The sleeve 106 is desirably mounted so that it may be rotated with respect to the partition 105 and also may be moved longitudinally through an opening 107 therein. To this end, the opening 107 in the partition desirably has affixed therein ball bearings 108, 109 through which the sleeve 106 extends. As shown in Fig. 2, the inner race of bearing 109 desirably has a lateral extension 111 with a set screw 112 so that when said set screw 112 is loosened the sleeve 106 may be moved longitudinally of the opening in said partition and the set screw 112 may then be tightened to retain the sleeve 106 in position of adjustment.

The sleeve 106 desirably has a plurality of guide members 85 therein, six being shown in the illustrative embodiment. As is clearly shown in Fig. 2, the guide members 85 are affixed as by welding to the inner surface of the sleeve so that they will be securely retained with respect thereto. The opening 92 in the guide members in the sleeve 106 are so arranged that each cable 93 at the left end of the sleeve, for example, will be displaced 180° with respect to such cable at the right end of the sleeve. Such 180° displacement of all of the cables passing through the guide members 85 in the sleeve 106 provides bending movement of the clamp end of the manipulator in the opposite direction to the bending movement applied to the handle end, as will hereinafter be described.

In the mount for the manipulator shown in Fig. 8 in which corresponding parts have the same reference numerals primed as the mount shown in Fig. 2, no such 180° displacement of the cables is provided and in such embodiment, upon bending movement applied to the handle end of the manipulator, bending movement will be imparted to the clamp end in the same direction.

In the operation of the manipulator, the operator will be positioned adjacent the input end or handle of the manipulator on one side of the partition. The set screw 112 is loosened and the operator can adjust the position of the output or clamp end of the manipulator by moving the sleeve 106 longitudinally through opening 107 so that said clamp end is positioned directly over the work to be performed, i. e., over a piece of radioactive material or a sterile solution to be lifted, or the like. The set screw 112 is then tightened to retain the sleeve in fixed position. To move the clamp arms 66 together, the operator need merely press on the grip member 38. As a result, as shown in Figs. 3 and 4, when the grip member 38 is pushed inwardly, through the linkage 44 and 46, the shaft 18 will be pulled downwardly as will be the flexible shaft 12, to lift the shaft 57 (Fig. 7), compressing the coil spring 79. As a result, the pin 71 will move upwardly, coacting with slots 68 to cause the plates 67 to pivot, bringing the free ends 74 of the clamp arms 73 toward each other to grip the desired object.

After the object has been gripped, if at such time the operator wishes to rotate the object, he need merely turn the crank 37. As a result, through the worm 32, the worm gear 29 will be rotated to turn sleeve 30 and rectangular shaft 18 therein to rotate the flexible shaft 12 affixed thereto. Rotation of shaft 12 will rotate the tubular member 64 at the output end of the manipulator and as such tubular member is rotatably mounted on the elongated sleeve 55, the tubular member and the gripping members will rotate freely.

By merely maintaining the tension on the grip 38, the tension on the object likewise will be maintained so that the latter is not likely to be loosened. In addition to such rotary and gripping motion, the operator may cause other motions to be accomplished in the following manner. The operator need merely move the handle 13, say to the left as shown in Fig. 1, in such manner as to bend the flexible casing 11 adjacent the end of the latter near the cylindrical extension 15. As a result, the cables 93 on the right side of the casing 11, as shown in Figs. 1 and 3, will have tension applied thereto and due to the 180° displacement of the cables through the sleeve 106, as shown in Fig. 2, tension will be applied to the ends of the cables 93 at the output end of the manipulator on the right side thereof, as shown in Fig. 1, to move the associated end of the casing 11 and the clamp to the right. Similarly, by reason of the plurality of cables 93 spaced around the casing 11, any other bending motion imparted to the handle end of the manipulator will also impart a bending motion in the opposite direction to the other or output end of the manipulator. By reason of the plurality of closely spaced guide members 85, play in the cables 93 will be taken up and hence the movement at the output end of the manipulator will substantially correspond in magnitude to that at the input or handle end.

Referring to Fig. 8, where there is no 180° displacement of the cables, it is apparent that when bending movement in any direction is imparted to the handle end of the manipulator, the movement of the output or clamp end will be in the same direction.

With the construction above described, substantially universal motion is afforded at the output end of the manipulator. Thus an object can be gripped and it can be rotated, and by reason of the rotary and sliding mount for the sleeve 106 and the plurality of cables, the object can be moved in any direction toward and away from the partition, all without need for motors, cams, elaborate linkages or control systems.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A manipulator comprising a flexible elongated tubular casing, means to support said casing between its ends, a flexible shaft extending through said casing, a hollow handle affixed at one end of said casing, said shaft extending into said handle, a crank rotatably mounted in said handle, a transmission from said crank to the end of said shaft in said handle to rotate the shaft, means for mounting a tool at the other end of said shaft to be rotated thereby, a plurality of elongated cables extending along said casing and affixed at their respective ends to the latter, whereby upon bending of said casing at one end to which the ends of the cables are affixed in direction to apply tension on at least one of said cables, tension will be applied to the other end of said casing at the region at which the other end of said cable is affixed to cause bending of said other end of the casing in the direction of application of tension at said other end.

2. The combination set forth in claim 1 in which said transmission comprises a sleeve rotatably mounted in said handle, a shaft extending through said sleeve is rotatable therewith yet free to move longitudinally therethrough, a worm gear is affixed to said sleeve, and a worm is connected to said crank and meshes with said worm gear to rotate the latter upon rotation of said crank.

3. The combination set forth in claim 2 in which a lever is pivotally mounted in said handle and extends outwardly therefrom, a second lever is pivotally mounted in said handle and has a yoke end connected to the inner end of said shaft, and a link connects the free ends of said levers, whereby upon pivoting of said first lever, the second lever will pivot to move said shaft longitudinally in said sleeve.

4. A manipulator comprising a flexible elongated member, means to support said elongated member between its ends, a plurality of elongated cables extending along said member and affixed at their respective ends to the latter, a plurality of guide means for said cables affixed to said flexible elongated member and spaced along its length, said guide means retaining said cables in spaced relation around the periphery of said flexible member and restraining said cables from lateral displacement with respect thereto but permitting movement of said cables along said flexible member between the affixed ends of said cables, each of said guide means comprising a pair of discs through which the flexible member extends, a resilient ring encompassing said flexible member between each of said pair of discs, and means to clamp the discs together to compress the resilient ring therebetween for gripping of the outer periphery of said flexible member by the inner periphery of said resilient ring to retain the guide means in fixed position on said flexible member, whereby upon bending of said flexible member at one end to which the ends of the cables are affixed in direction to apply tension to said cables, tension will be applied to the other end of said flexible member at the region at which the other ends of the cables are affixed to cause bending of said other end of the member in the direction of application of tension at said other end.

5. The combination set forth in claim 4 in which the opposed inner peripheries of each of said pairs of discs is beveled on the inner surfaces thereof and said resilient ring is positioned between said opposed beveled surfaces.

References Cited in the file of this patent

UNITED STATES PATENTS

| | | |
|---|---|---|
| 2,595,134 | Gordon | Apr. 29, 1952 |
| 2,632,574 | Goertz | Mar. 24, 1953 |